(12) United States Patent
Zhan et al.

(10) Patent No.: US 9,411,913 B2
(45) Date of Patent: Aug. 9, 2016

(54) WEAR-OUT DETECTION METHODS FOR PRINTED CIRCUIT BOARD ASSEMBLY COMPONENTS USED IN DOWNHOLE OILFIELD ENVIRONMENTS

(75) Inventors: Sheng Zhan, Houston, TX (US); Izhar Ahmad, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 679 days.

(21) Appl. No.: 13/251,418

(22) Filed: Oct. 3, 2011

(65) Prior Publication Data

US 2012/0084065 A1    Apr. 5, 2012

Related U.S. Application Data

(60) Provisional application No. 61/389,992, filed on Oct. 5, 2010.

(51) Int. Cl.
*G06G 7/48* (2006.01)
*G06F 17/50* (2006.01)

(52) U.S. Cl.
CPC ........ *G06F 17/5009* (2013.01); *G06F 2217/76* (2013.01)

(58) Field of Classification Search
CPC . G06F 17/5009; G06F 2217/76; E21B 47/00; G01V 2200/14; G01V 99/00
USPC ............................... 703/10, 13, 2, 6, 7; 702/6
See application file for complete search history.

(56) References Cited

U.S. PATENT DOCUMENTS

| | | | |
|---|---|---|---|
| 6,993,446 B2 | 1/2006 | Gunawardana et al. | |
| 7,474,989 B1 | 1/2009 | Wilcoxon | |
| 7,962,319 B2 * | 6/2011 | Grayson | 703/10 |
| 8,204,697 B2 * | 6/2012 | Garvey et al. | 702/34 |
| 2005/0197813 A1 | 9/2005 | Grayson | |
| 2006/0085134 A1 | 4/2006 | Dion et al. | |
| 2009/0299654 A1 * | 12/2009 | Garvey et al. | 702/34 |
| 2010/0235112 A1 * | 9/2010 | Kesler et al. | 702/35 |
| 2010/0286800 A1 * | 11/2010 | Lerche et al. | 700/90 |
| 2010/0332201 A1 * | 12/2010 | Albarede et al. | 703/2 |
| 2011/0060568 A1 * | 3/2011 | Goldfine et al. | 703/6 |
| 2011/0114830 A1 * | 5/2011 | Reijonen et al. | 250/251 |

OTHER PUBLICATIONS

Loecher et al. "Concurrent Estimation of Time-to-Failure and Effective Wear"., Proceedings of the 2003 Maintenance and Reliability Conference. 13 Pages.*
International Search Report and Written Opinion dated Apr. 27, 2012 for International Application No. PCT/US2011/0545731.

* cited by examiner

*Primary Examiner* — Eunhee Kim
(74) *Attorney, Agent, or Firm* — Cantor Colburn LLP

(57) ABSTRACT

A method, apparatus and computer-readable medium for determining a lifespan of an electronic component in a downhole environment is disclosed. A first wear-out model is created that is related to a selected electronic component. A physical condition of the selected electronic component is examined at a selected examination time. The physical condition is generally due to the downhole environment in which the electronic component is disposed. A second wear-out model for the selected electronic component is created from the first wear-out model and the examined physical condition of the selected electronic component.

18 Claims, 5 Drawing Sheets

WEAR-OUT DETECTION METHODS FOR PRINTED CIRCUIT BOARD ASSEMBLY COMPONENTS USED IN DOWNHOLE OILFIELD ENVIRONMENTS

CROSS-REFERENCE TO RELATED APPLICATIONS

The present application claims priority to U.S. Provisional Application Ser. No. 61/389,992, filed Oct. 5, 2010.

BACKGROUND OF THE DISCLOSURE

Drilling tools used in petroleum exploration typically include one or more electronic components or printed circuit board assemblies (PCBAs) for performing various operations downhole. In a downhole environment, these PCBAs are subjected to various thermo-mechanical stresses which can cause wear or failure. Therefore, they have a reduced life span that requires maintenance and repair on an accelerated basis. However, when drilling operations have to be stopped for any reason, including tool maintenance, time and money is lost. Therefore, knowing a failure time of a PCBA can be used to implement cost-effective maintenance strategies. The present disclosure provides a wear-out model that predicts a remaining lifespan of a PCBA.

SUMMARY OF THE DISCLOSURE

In one aspect, the present disclosure provides a method of creating a wear-out model for an electronic component in a downhole environment, including: creating a first wear-out model related to a selected electronic component; examining a physical condition of the selected electronic component due to the downhole environment at a selected examination time; and creating a second wear-out model for the selected electronic component from the first wear-out model and the examined physical condition of the selected electronic component.

In another aspect, the present disclosure provides an apparatus for creating a wear-out model for a selected electronic component used in a downhole environment, including a processor configured to: create a first wear-out model related to the selected electronic component, obtain data related to a physical condition of the selected electronic component at a selected examination time, and create a second wear-out model for the selected electronic component from the first wear-out model and the obtained physical condition data of the selected electronic component.

In yet another aspect, the present disclosure provides a computer-readable medium include instruction therein and accessible to a processor, wherein the processor reads the instructions to perform a method for creating a wear-out model for a selected electronic component used in a downhole environment, including: creating a first wear-out model related to the selected electronic component, obtaining data related to a physical condition of the selected electronic component at a selected examination time, and creating a second wear-out model for the selected electronic component from the first wear-out model and the obtained physical condition data of the selected electronic component.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description, taken in conjunction with the accompanying drawings, in which like elements have been given like numerals and wherein.

DETAILED DESCRIPTION OF THE DISCLOSURE

Figure 1:
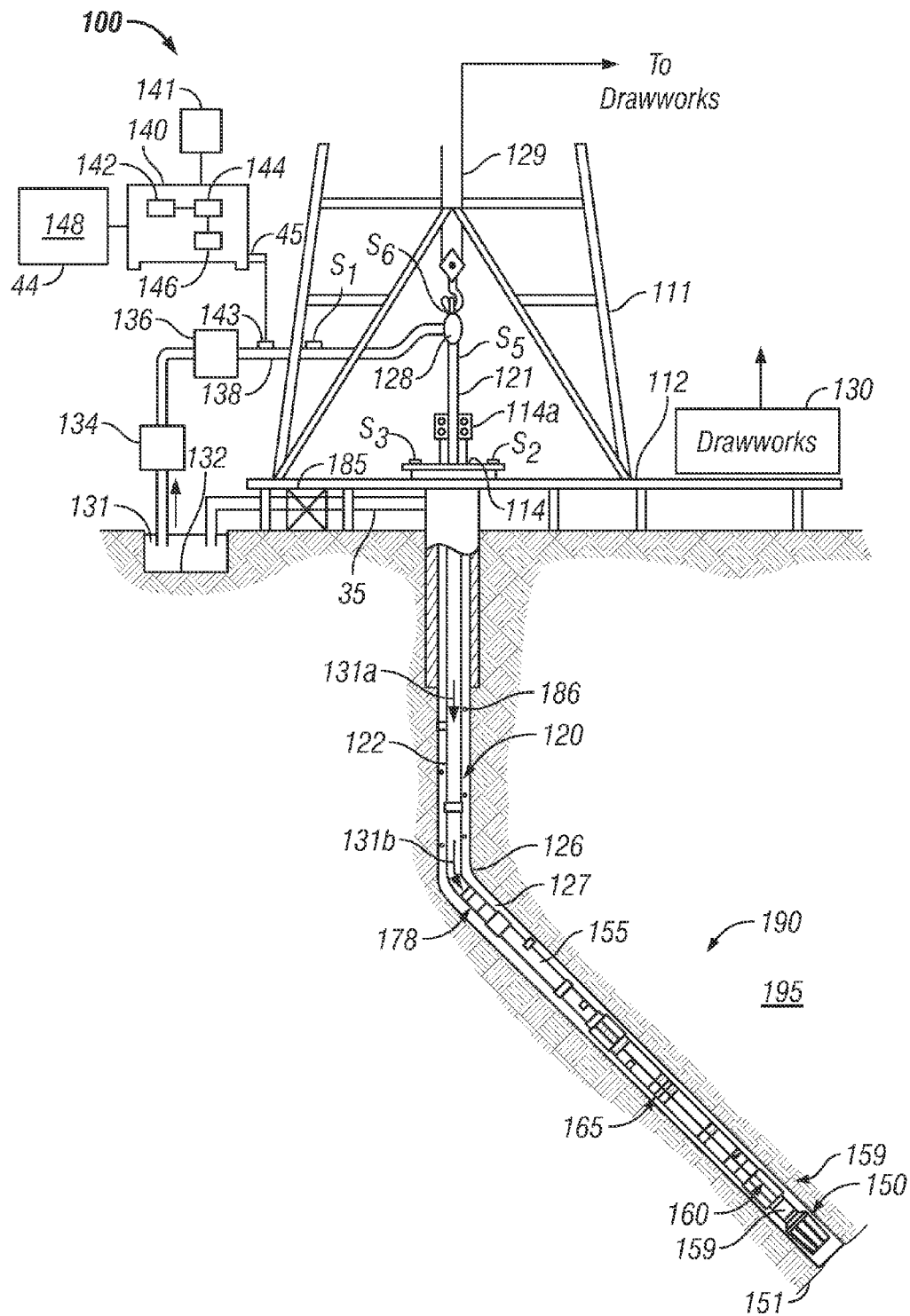
FIG. 1 is a schematic illustration of an exemplary drilling system suitable for using an apparatus made according to various embodiments of this disclosure for drilling boreholes according to the methods described herein.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottomhole assembly ("BHA") 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190 attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 can be rotated by a top drive (not shown) instead of by the prime mover and the rotary table 114. The operation of the drawworks 130 is known in the art and is thus not described in detail herein.

In an aspect, a suitable drilling fluid 131 (also referred to as "mud") from a source 132 thereof, such as a mud pit, is circulated under pressure through the drill string 120 by a mud pump 134. The drilling fluid 131 passes from the mud pump 134 into the drill string 120 via a de-surger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 provide information about the torque and the rotational speed of the drill string 120. Rate of penetration of the drill string 120 is determined from the sensor $S_5$, while the sensor $S_6$ provides the hook load of the drill string 120.

In some applications, the drill bit 150 is rotated by rotating the drill pipe 122. However, in other applications, a downhole motor 155 (mud motor) disposed in the drilling assembly 190 also rotates the drill bit 150. The rate of penetration ("ROP") for a given drill bit and BHA largely depends on the WOB or the thrust force on the drill bit 150 and its rotational speed.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided from a program to the surface control unit 140. The surface control unit 140 displays desired drilling parameters and other information on a display/monitor 141 that is utilized by an operator to control the drilling operations. In one embodiment, the surface control unit 140 is a computer-based unit that includes a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 further communicates with a remote control unit 148. In one aspect, the surface control unit 140 processes data relating to the drilling operations, data from the sensors and devices on the surface, data received from downhole and controls one or more operations of the downhole and surface devices.

The drilling assembly 190 also contain formation evaluation sensors or devices (also referred to as measurement-while-drilling, "MWD," or logging-while-drilling, "LWD," sensors) determining resistivity, density, porosity, permeability, acoustic properties, nuclear-magnetic resonance properties, corrosive properties of the fluids or formation downhole, salt or saline content, and other selected properties of the formation 195 surrounding the drilling assembly 190. Such sensors are generally known in the art and for convenience are generally denoted herein by numeral 165. In one embodiment, the formation evaluation sensors 165 includes a printed circuit board assembly (PCBA) 193 coupled to or integrated within the sensors to provide measurements of the formation.

The exemplary drilling assembly 190 further includes a variety of other sensors 191 and communication devices 159 for controlling and/or determining one or more functions and properties of the drilling assembly (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc. In one embodiment, one or more sensors 191 can be integrated into a PCBA 193 or at a location adjacent to the PCBA 193 and measures the drilling profile of one of the properties of the drilling assembly experienced at the PCBA. In one aspect the sensors measure a drilling parameter experienced at the PCBA and send the measurements to a processor for determining remaining life of the PCBA using a wear-out model, such as shown in FIG. 3. A detailed description of the drilling assembly is provided below in reference to FIG. 2.

It is understood that while the present disclosure is described with respect to PCBAs, this is not meant as a limitation of the disclosure. The methods discloses herein can be equally applied to any electronic component. An electronic component may include active components, such as PCBAs, transistors, etc., or passive components, such as resistors, capacitors, etc.

Figure 2:
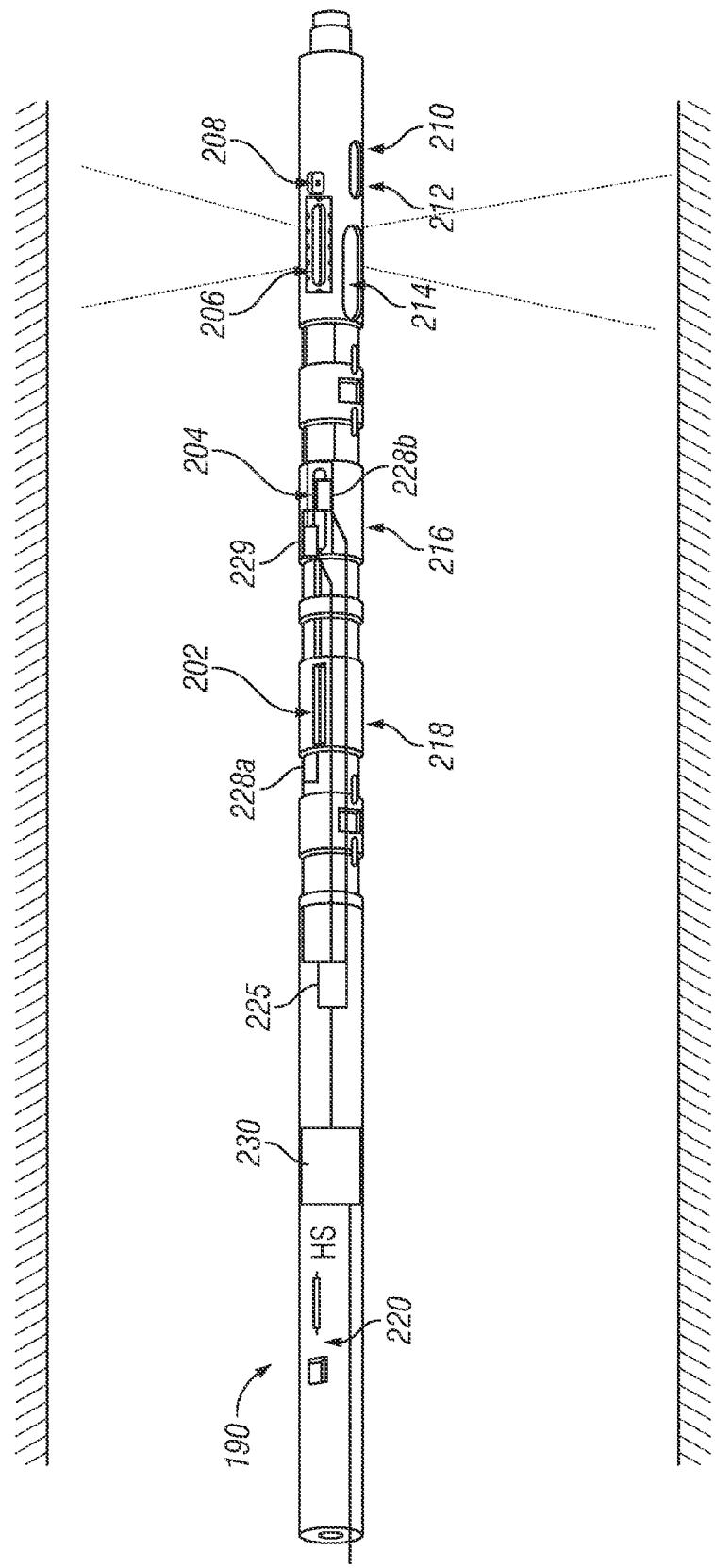
FIG. 2 shows a detailed illustration of the exemplary drilling assembly of FIG. 1.
Figure 3:
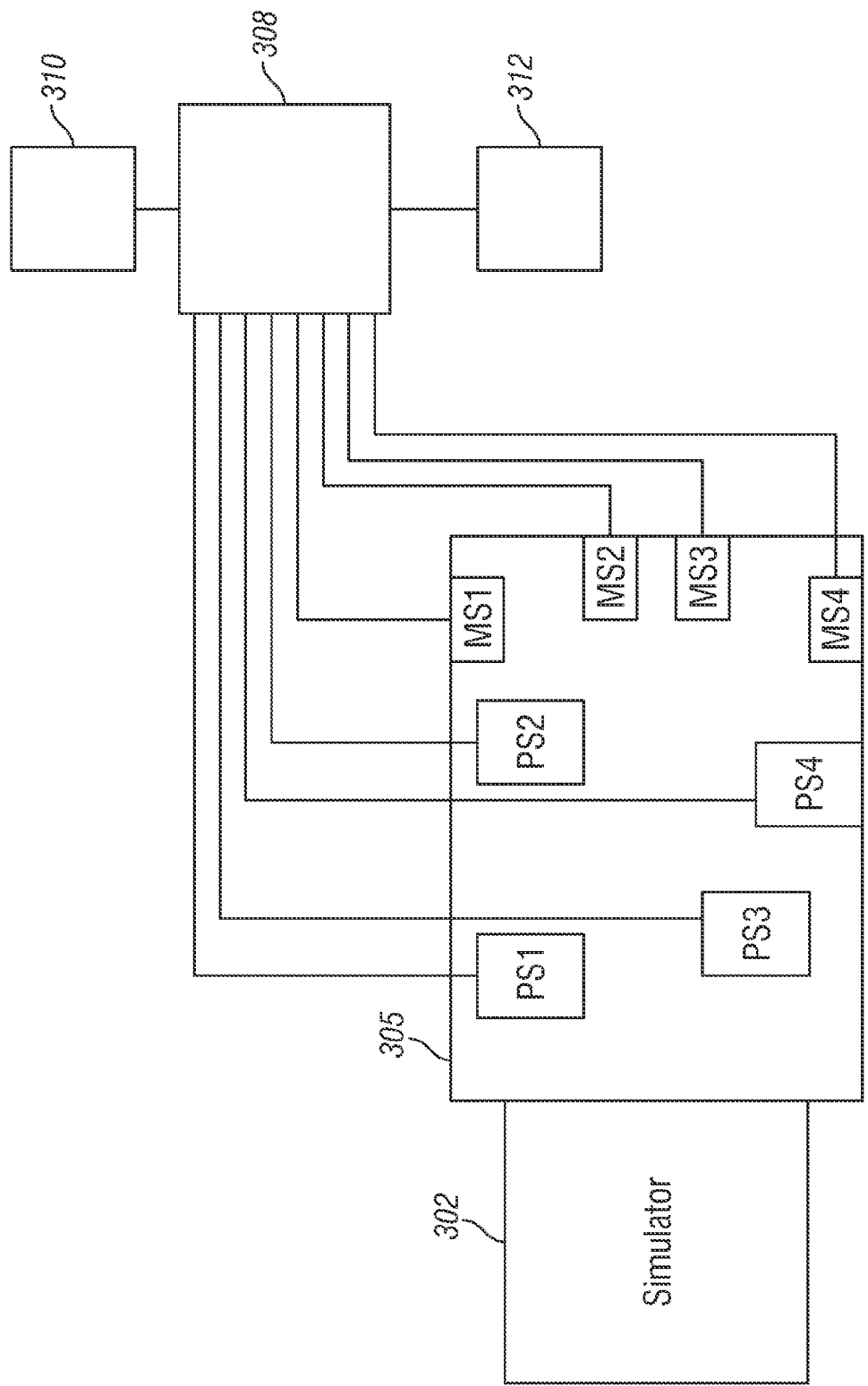
FIG. 3 shows an exemplary apparatus for obtaining prognostic measurements related to a lifespan of a PCBA in one embodiment of the present disclosure.

FIG. 2 shows a detailed illustration of the exemplary drilling assembly of FIG. 1. Drilling assembly 190 includes a sonde 220 which includes one or more exemplary printed circuit board assemblies (PCBAs) that are affected by wear and use in downhole environmental conditions. Exemplary PCBAs includes PCBAs for a power supply 202, a master memory board 204, a pressure/gamma controller board 206, read out board 208, pressure sensor 210, battery 212, gamma board 214, transmitter board 216 and receiver board 218. The exemplary drilling assembly is not limited to these exemplary PCBAs and in other embodiments can include an accelerometer board, and magnetic core driver, a low voltage power supply (LVPS modem), and annular pressure transducer, and a magnetometer, among others. The drilling assembly further includes various measurement sensors such as exemplary measurement sensors 228a,b for obtaining a measurement of one or more downhole parameters such as, for example, lateral vibration, stick slip, axial vibration and temperature experienced at the exemplary PCBA. The measurement sensors are not limited to obtaining drilling profiles of only these parameters. In one embodiment the measurement sensor is at an adjacent location to a PCBA, such as sensor 228a is adjacent to power supply PCBA 202. In another embodiment, the sensor is integrated into a PCBA such as sensor 228b is integrated into master memory board 204. Thus, the measurement sensors experience substantially the same conditions as experienced by the PCBA. The exemplary PCBA can also include one or more associated prognostic sensors 129 for providing data related to a time to failure of the associated PCBA.

Figure 4:
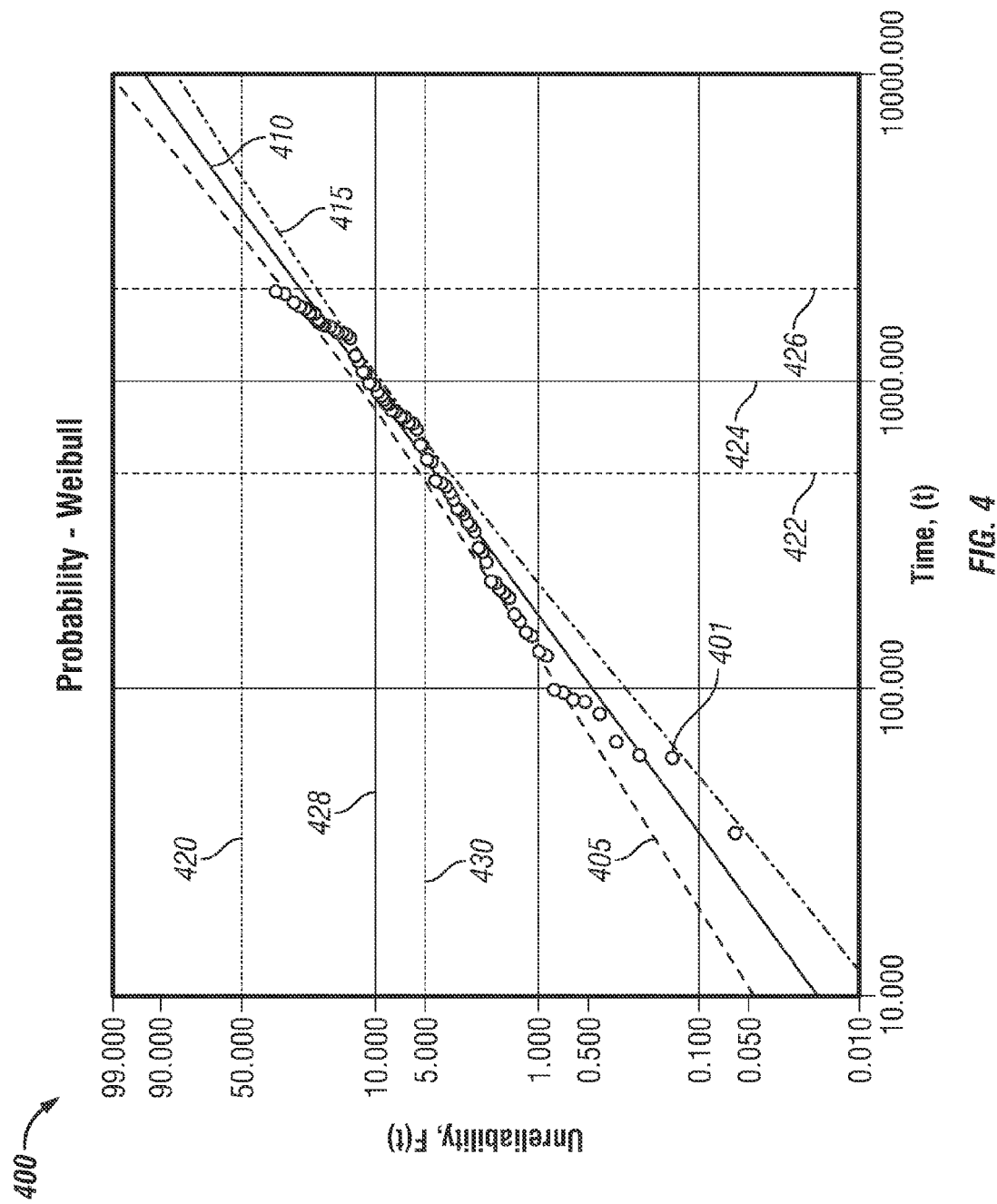
FIG. 4 shows an wear-out model of an exemplary printed circuit board assembly (PCBA) conveyed in a downhole environment.
Figure 5:
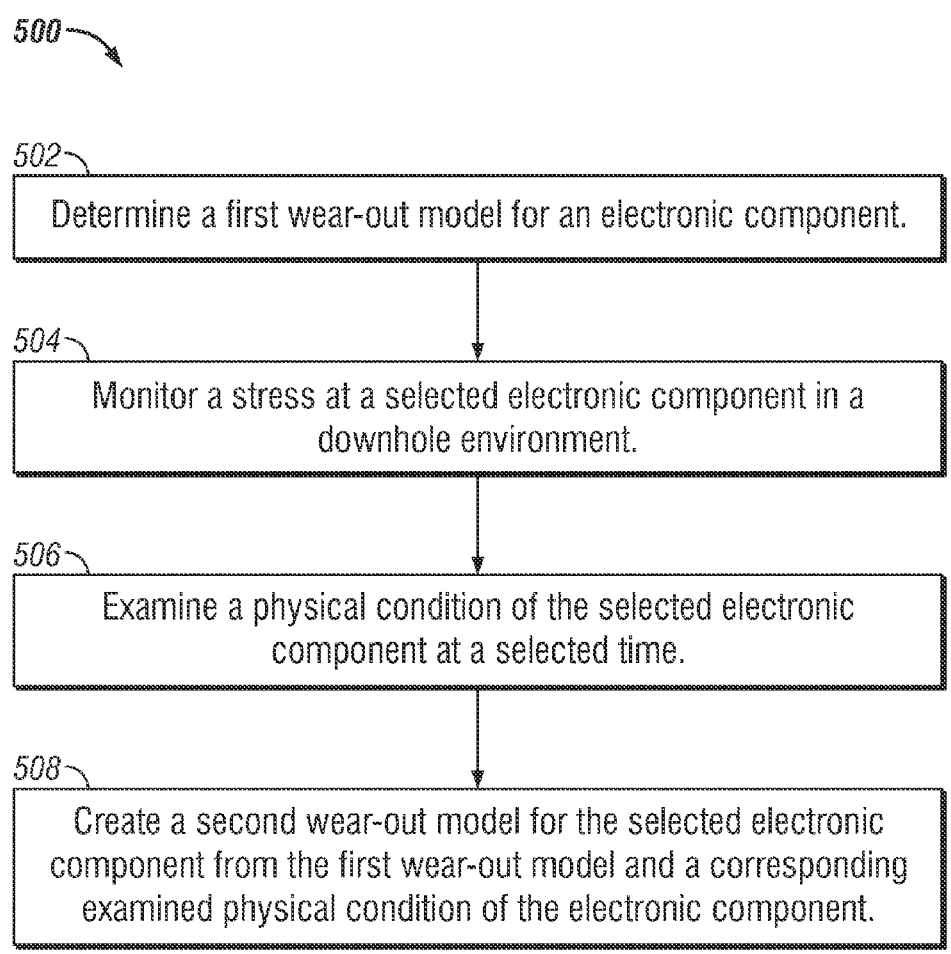
FIG. 5 shows a flowchart of an exemplary method of the present disclosure for determining a life span of a PCBA.

The one or more measurement sensors 228a,b are coupled to a processor 225 that in one aspect estimates a remaining life of a selected PCBA using the exemplary methods described herein with respect to FIG. 4 and the flowchart of FIG. 5. Telemetry system 230 is located on the BHA 190 for providing data to a surface location. In an alternate embodiment, the processor estimating the remaining life of the PCBA is located at the surface location and measurements are provided from the one or more sensors 228a,b to the surface processor via the telemetry unit 206. In another aspect, the processor 125 is coupled to the one or more prognostic sensors 129 and obtains data related to a failure time of the prognostic sensors and determines a time to failure of the associated PCBA.

In one embodiment, a wear-out model is determined from a fit of stress measurements due to drilling operation parameters and point-of-failure of a PCBA to a distribution. Drilling parameters are measured and a drilling profile of the PCBA is obtained from the measured drilling parameters. A drilling profile typically includes measurements taken of a plurality of drilling parameters. In the exemplary embodiment, the drilling profile includes the drilling parameters of lateral vibration, axial vibration, stick-slip and temperature. For each parameter, a stress due to a selected drilling parameter is categorized according to predefined stress levels. Exemplary drilling parameters and their exemplary stress levels are shown in Tables 1-4. Table 1 shows an exemplary measurement table having predefined stress levels for lateral vibration measurements.

TABLE 1

Lateral Vibration

| Level | g_RMS |
|---|---|
| 0 | $0.0 \leq x < 0.05$ |
| 1 | $0.5 \leq x < 1.0$ |
| 2 | $1.0 \leq x < 2.0$ |
| 3 | $2.0 \leq x < 3.0$ |
| 4 | $3.0 \leq x < 5.0$ |
| 5 | $5.0 \leq x < 8.0$ |

TABLE 1-continued

| Lateral Vibration | |
|---|---|
| Level | g_RMS |
| 6 | 8.0 ≤ x < 15.0 |
| 7 | 15.0 ≤ x |

Lateral vibration levels are defined from 0-7 and are derived from a measurement of lateral vibration in units of g_RMS (g_Root Mean Squared). Acceleration is often expressed in the unit in terms of the Earth's natural gravitational acceleration, g=9.91 meters per second squared. The root mean squared (RMS) value of g gives an indication of both the mean and dispersion of a plurality of acceleration measurements and is indicative of the amount of detrimental energy experienced during a selected period of vibration. Thus, a measurement of 1.5 g_RMS for lateral vibration is recorded as a stress level 3.

Table 2 shows an exemplary measurement table having predefined stress levels for stick slip measurements.

TABLE 2

| Stick Slip | | |
|---|---|---|
| Level | g_RMS | |
| 0 | 0.0 ≤ s_1 < 0.2 | Normal State |
| 1 | 0.2 ≤ x < 0.4 | Normal State |
| 2 | 0.4 ≤ x < 0.6 | Torsional Oscillations |
| 3 | 0.6 ≤ x < 0.8 | Torsional Oscillations |
| 4 | 0.8 ≤ x < 1.0 | Torsional Oscillations |
| 5 | 1.0 ≤ x < 1.2 | Stick Slip |
| 6 | 1.2 ≤ s_1 | Stick Slip |
| 7 | s_2 > 0.1 | Backward Rotation |

Stick slip levels are defined from 0-7 and are derived from the parameters s_1 and s_2 which are related to instantaneous RPM measurements of stick-slip. The parameter s_1 is a normalized difference between minimum RPM and maximum RPM detected over a measurement period as shown in Eq. (1):

$$s\_1 = \frac{\max\_RPM - \min\_RPM}{2 * Avg\_RPM} \quad \text{Eq. (1)}$$

The parameter s_2 is a percentage of time in which the downhole tool rotates backward as a result of the stick-slip movement of the drill string.

Table 3 shows an exemplary measurement table having predefined stress levels for axial vibration measurements.

TABLE 3

| Axial Vibration | |
|---|---|
| Level | g_RMS |
| 0 | 0.0 ≤ x < 0.05 |
| 1 | 0.5 ≤ x < 1.0 |
| 2 | 1.0 ≤ x < 2.0 |
| 3 | 2.0 ≤ x < 3.0 |
| 4 | 3.0 ≤ x < 5.0 |
| 5 | 5.0 ≤ x < 8.0 |
| 6 | 8.0 ≤ x < 15.0 |
| 7 | 15.0 ≤ x |

Axial vibration levels are defined from 0-7 and are derived from measurements of axial vibration in units of g_RMS.

Table 4 shows an exemplary measurements table having predefined stress levels for temperature measurements.

TABLE 4

| Temperature | |
|---|---|
| Level | g_RMS |
| 0 | 15 ≤ Temp < 85 |
| 1 | 85 ≤ Temp < 125 |
| 2 | 135 ≤ Temp < 150 |
| 3 | 155 ≤ Temp < 165 |
| 4 | 165 ≤ Temp < 175 |
| 5 | 175 ≤ Temp < 185 |
| 6 | 185 ≤ Temp < 200 |
| 7 | 200 ≤ Temp |

Temperature levels are defined from 0-7 and are a derived from a measure of temperature exposure over time. Tables 1-4 are used to quantify stress measurements experienced at a PCBA.

Tables 5-8 shows a set of drilling parameters measured for an exemplary PCBA in a downhole environment and binned according to the predefined stress levels of Tables 1-4, respectively. The top row of each of Tables 5-8 indicate the stress levels and the bottom row indicates the amount of time in hours that the PCBA experiences stress at the selected stress level. Time is indicated in hours.

TABLE 5

| Lateral Vibration Levels (hrs) | | | | | | | | |
|---|---|---|---|---|---|---|---|---|
| 0 | 1 | 2 | 3 | 4 | 5 | 6 | 7 | Total |
| 30.3 | 11.9 | 37.9 | 16.7 | 2.5 | 0.2 | 0 | 0 | 90.5 |

TABLE 6

| Stick-slip Levels (hrs) | | | | | | | | |
|---|---|---|---|---|---|---|---|---|
| 0 | 1 | 2 | 3 | 4 | 5 | 6 | 7 | Total |
| 58.8 | 19.2 | 14.8 | 3.6 | 0.9 | 0.4 | 1.7 | 1.8 | 101.2 |

TABLE 7

| Axial Vibration Levels (hrs) | | | | | | | | |
|---|---|---|---|---|---|---|---|---|
| 0 | 1 | 2 | 3 | 4 | 5 | 6 | 7 | Total |
| 58.2 | 38.7 | 2.3 | 0.2 | 0 | 0 | 0 | 0 | 99.4 |

TABLE 8

| Temperature Levels (hrs) | | | | | | | | |
|---|---|---|---|---|---|---|---|---|
| 0 | 1 | 2 | 3 | 4 | 5 | 6 | 7 | Total |
| 13.8 | 79.7 | 0 | 0 | 0 | 0 | 0 | 0 | 93.5 |

In one aspect, the values of Tables 5-8 can provide a stress profile for the exemplary PCBA at a time of failure of the PCBA. In addition, the stress profile can be provided for any selected time, including a time at which use of the PCBA is suspended. In one aspect, one or more PCBAs can be tested to failure and the measured stress profile are used to determine a wear-out model of the PCBA using, for example, Weibull analysis.

FIG. 2 shows an exemplary controlled testing environment for estimating a time to failure of an exemplary PCBA. PCBA 205 is coupled to a simulator 202 which simulates one or more drilling parameters such as lateral vibration, axial vibration, stick-slip, and temperature, among others. One or more exemplary measurement sensors MS1-MS4 can be coupled to the PCBA to record a stress level at the PCBA. In an exemplary embodiment, MS1 is responsive to an axial vibration, MS2 is responsive to a stick-slip vibration, MS3 is responsive to a lateral vibration and MS4 is responsive to temperature. In addition, the PCBA 205 has one or more prognostic sensors PS1-PS4 integrated with the PCBA or at a nearby location to the PCBA for sensing the various drilling parameters at the PCBA. In the exemplary testing environment for FIG. 2, a PCBA can be tested at an accelerated pace. For example, a PCBA may be subjected to 10 hours of 100° temperature during testing in order to simulate an effect of 40 hours of 150° temperature which may be typical of borehole conditions. A prognostic sensor can be selected to fail at an accelerated rate to the PCBA, the accelerated rate indicated by an acceleration factor. The prognostic sensor thus fails at a time prior to a time of failure of the PCBA. Failure times of multiple prognostic sensors are used to estimate the time of failure of the PCBA. In one embodiment, an acceleration factor and estimated time to failure of a prognostic sensor is determined from a wear-out model such as the exemplary wear-out model described herein.

Processor 208 is coupled to the exemplary measurement sensors M1-M4 for monitoring the stress levels at the PCBA. Processor 208 is also coupled to the exemplary prognostic sensors P1-P4 to obtain a time of failure of the prognostic sensors. In one aspect, the processor can correlate a failure of a prognostic sensor to measurements obtained at the measurements sensors to obtain a wear-out model for the PCBA using for example a Weibull analysis. In another aspect, the processor 208 can estimate a time to failure of the PCBA using the failure times of the prognostic sensors. The processor is coupled to a program module 210 which supplies instructions to the processor for performing calculations related to various aspect of the present disclosure and a recording medium 212 for storing various results of the calculations.

In one embodiment, a first wear-out model may be obtained from data obtained in the controlled testing environment. In a typical controlled testing environment, a PCBA may be subjected to an accelerated stress in order to estimate a condition that the PCBA experiences when used in a borehole. For example, a PCBA may be subjected to 10 hours of 150° C. temperature during testing in order to simulate an effect of 40 hours of 100° C. temperature which may be typical of borehole conditions. An exemplary first wear-out model is shown in FIG. 4.

FIG. 4 shows an exemplary wear-out model of an electrical component such as a PCBA subjected to exemplary downhole conditions and drilling parameters. FIG. 4 shows a graph of unreliability vs. time for the exemplary PCBA which can be used to determine a lifespan of an exemplary PCBA of FIG. 2. Unreliability is plotted along the y-axis on a logarithmic scale. Time is plotted along the x-axis on a logarithmic scale. Graph 400 shows a plurality of data points 401 obtained for a reliability of the PCBA obtained from either historical downhole data or data obtained from a controlled testing environment or a combination thereof. Also shown are a best fit curve 410 to the plurality of data points as well as curves 405 and 415 representing an upper and lower bound of a region of 95% confidence level of the plurality of data points. Table 1 is related to the graph 400 and indicates exemplary points on the graph.

TABLE 9

Reliability Prediction of Exemplary PCBA

| Confidence Level (90%) | Upper Bound | Results | Lower Bound |
|---|---|---|---|
| Mean Life | 5341 hours | 4211 hours | 3321 hours |
| Reliability of Mission End Time (500 hours) | 0.9655 | 0.9568 | 0.9460 |
| Reliability of Mission End Time (1000 hours) | 0.9075 | 0.8898 | 0.8689 |
| Reliability of Mission End Time (2000 hours) | 0.7821 | 0.7344 | 0.6785 |
| Warranty Time (Required Reliability 0.90) | 1060 hours | 929 hours | 814 hours |
| Warranty Time (Required Reliability 0.95) | 649 hours | 556 hours | 476 hours |

As seen in Table 9, the exemplary PCBA has a mean lifetime of 4211 hours, with a lower bound of 3321 hours and an upper bound of 5341 hours. This is indicated at the intersection of curves 410, 405 and 415, respectively with horizontal line 420 indicating 50% unreliability. Additional horizontal lines 428, 430 and vertical lines of 422, 424, 426 similarly provide tables entries. At a mission time of 500 hours (vertical line 422), the reliability of the PCBA is 95.68% with a lower bound of 94.6% and an upper bound of 96.55%. At a mission time of 1000 hours (vertical line 424), the reliability of the PCBA is 88.98% with a lower bound of 86.89% and an upper bound of 90.75%. At a mission time of 2000 hours (vertical line 426), the reliability of the selected part is 73.44% with a lower bound of 67.85% and an upper bound of 78.21%.

In order to operate a PCBA to 90% reliability (horizontal line 428), the PCBA can be operated for 929 hours, with a lower bound of 814 hours and an upper bound of 1060 hours. In order to operate the PCBA to 95% reliability (horizontal line 430), the PCBA can be operated for 556 hours, with a lower bound of 476 hours and an upper bound of 649 hours.

In one aspect, a PCBA is employed in a borehole and a stress is measured at the PCBA in use downhole. The downhole stress at the PCBA can be compared to a wear-out model, such as the exemplary first wear-out model determined during testing of a similar PCBA, and the PCBA can be removed from the borehole at a time examined from the comparison. In one aspect, a physical condition of the PCBA is obtained using the exemplary testing methods discussed below. A correlation of the examined physical condition and a wear-out model can be established. A second wear-out model is obtained from the first wear-out model and data obtained from the determined physical condition.

FIG. 5 shows a flowchart of an exemplary method of the present disclosure for obtaining a wear-out model of a selected electronic component. In Box 502, a first wear-out model is determined for the selected electronic component from a test performed on a electronic component related to the selected electronic component at a surface location, such as in a controlled testing environment. In Box 504, a stress is monitored at the selected electronic component in a downhole environment. In Box 506, a physical condition of the selected electronic component is examined at a selected time that can be a time selected by a comparison of the monitored stress to the first wear-out model. Typically, the selected time corresponds to a time at which the first wear-out model indicates that a electronic component should no longer be used or is in danger of failure. In Box 508, the examined physical condition is compared to the first wear-out model to create a second wear-out model. In one aspect, the examined physical condition may verify the first wear-out model. In another aspect, the examined physical condition may be used to amend the first wear-out model to obtain a second wear-out model. Also, the examined physical condition can be entered into a database that relates the examined physical condition to a level of use of the electronic component, such as a reliability of the electronic component, a remaining lifetime of the electronic component or a wear-out model of the electronic component. The second wear-out model may then be used to determine a remaining lifespan of a PCBA.

Non-destructive/non-invasive methods are generally used to examine a physical condition of a PCBA prior to use downhole and to determine a cause of failure for a failed PCBA. These methods generally provide an examination of the failed PCBA to determine the root cause of failure and to use such information to improve product design and reliability. Failure analysis includes identifying the failure modes (the way the product failed), identifying the failure site (where in the product failure occurred), identifying the failure mechanism (the physical phenomena involved in the failure), determining the root cause (the design, defect or loads which led to failure), and recommending failure prevention methods.

An exemplary failure analysis begins with the most non-destructive techniques and proceeds to more destructive techniques, thereby allowing the gathering of data from each technique throughout the analysis. A typical testing sequence proceeds from visual inspection of the PCBA, to electrical testing, non-destructive evaluation and finally destructive evaluation to confirm constructive models. Various exemplary testing techniques are discussed below.

Visual inspection includes observation of the PCBA and its components for various noticeable flaws such as cracks, burned-out regions, viability of electrical connections, etc. Electrical testing tests the electrical integrity of the PCBA using various measurements techniques such as Integrated Circuit Functional and Parametric Testing, Impedance/Material Analysis, Continuity Measurements, Surface Resistance Measurements, Contact Resistance Measurements, Resistance Monitoring during Accelerated Testing, Capacitance Measurements, the use of an oscilloscope, etc.

Non-destructive evaluation techniques include Forward Looking Infrared (FLIR) Imaging, Scanning Acoustic Microscope (SAM), 2-D/3-D X-rays, and Steady-state and Transient Power Consumption. Typically, FLIR Thermal Imaging can be used to provide a comparison of the failed PCBA to birth-date powered models. Scanning Acoustic Microscopy (SAM) is a non-destructive technique that can be used to image the internal features of a PCBA. SAM is sensitive to the presence of delaminations and can detect delaminations of sub-micron thickness. Both delamination/cracking and die attach voiding are assembly-related defects that can increase the susceptibility of components to failure, although they do not constitute failures by themselves. Delamination and cracking can result in sheared or lifted wirebonds, passivation cracking, metallization shifting, intermittent electrical failures and metallization/bond pad corrosion. Die attach voiding can lead to die cracking, die attach fracture, or thermal runaway due to poor heat dissipation through the die attach. SAM is also useful for detecting popcorning (cracking during heating) cracking/delamination, die attach voiding, evaluating flip chip underfill integrity and lid seal integrity in hermetically sealed packages. SAM can be used to inspect ceramic direct bond substrates for delamination and to determine a thickness of an internal layer of a material.

X-Ray Microscopy allows nondestructive assessment of internal damage, defects, and degradation in microelectronic devices. Illuminating a sample with X-ray energy provides images based on material density that allows characterization of solder voiding, wirebond sweep, and wirebond breakage in components. In addition, X-ray microscopy can reveal anomalies such as die attach voiding, solder pooling, or die shifting. X-rays can be used to test wire bonds and bonding epoxies in integrated circuits as well as to determine micro cracks and fractures in ceramic capacitors. Used in conjunction with SAM, X-ray microscopy can be used to identify failure sites in electronic components. Steady-state and Transient Power Consumption testing can determine an increase in leakage current due, for example, to chemical reactions and inter-metallic growths inside the PCBA components.

Destructive Evaluation techniques include, for example, Microsectioning, Decapsulation/Delidding, Microtesting, Focused ion Beam (FIB) Imaging, Transmission Electron Microscopy (TEM), Assessment of Popcorning PEMs (Plastic Encapsulated Microcircuits). Microsectioning is often used to identify an exact failure mechanism and root cause of failure. A first step in microsectioning often includes potting the component in an epoxy resin to prevent any damage. The potted component is then cut or ground until an area of interest is reached. Final polishing with diamond or aluminum particles remove any surface damage from previous step. Analysis of the polished microsection can be performed using, for example, optical and electron microscopy and energy dispersive spectroscopy (EDS). Decapsulation/Delidding allows for measurement of wirebond strengths and an optical view of operating integrated circuits.

Microtesting provides information on the quality and integrity of interconnects between electronic components and includes the measurement of the strength of die adhesives, wires, tabs, ball bonds, wedge bond, soldered surface mount leads, solder ball/bond pad interface, and solder bump/under bump metallurgy (UBM) interfaces, for example. Focused Ion Beam (FIB) Imaging uses a focused ion beam to perform product failure analysis by selectively removing dielectric or metal layers for probing and material analysis of underlying surface. Rapid cross-sections of buried circuitry can also be performed. Transmission Electron Microscopy (TEM) uses electrons to probe an electronic component and enables examining the component to a resolution scale as small as a single column of atoms. Assessment of Popcorning in PEMs determines the integrity of plastic encapsulating a microcircuit which can absorb moisture, leading to delamination during soldering and heating processes.

In various embodiments, the exemplary testing techniques provide a physical condition of a PCBA (such as a crack propagation). The obtained physical condition can be used to verify a first wear-out model or to amend a first wear-out model. In addition, a database of examined physical conditions can be established and a relation formed between the database of physical condition and a wear-out model such that a particular physical condition can be determined to correspond to a particular level of reliability on the exemplary wear-out model or a particular remaining lifetime.

In alternate embodiments, the exemplary wear-out models of the present disclosure can be used to provide an early warning of failure of a PCBA used downhole in during ensuing drilling operations. Additionally, the wear-out models can be used to extend maintenance cycles, avoid scheduled maintenances or forecast a desirable time for maintenance. In another aspect, the wear-out models can be used to assess the potential for extending the life of a PCBA, thereby reducing a need for redundancy of parts. The wear-out models can also be used in PCBA designs and qualification methods for parts in development. An operator can determine a maintenance schedule that reduces a cost of drilling or reduces a parameter of interest to the operator.

Therefore, in one aspect, the present disclosure provides a method of creating a wear-out model for an electronic component in a downhole environment, including: creating a first wear-out model related to a selected electronic component; examining a physical condition of the selected electronic component due to the downhole environment at a selected examination time; and creating a second wear-out model for the selected electronic component from the first wear-out model and the examined physical condition of the selected electronic component. In one embodiment, the method further includes monitoring a stress at the selected electronic component in the downhole environment and comparing the monitored stress to the first wear-out model to select the examination time. The first wear-out model can be created using another electrical component similar to the selected electrical component, such as a same model. A downhole stress can be simulated at the other electrical component. A failure rate of a plurality of sensors at the other electronic component is used to create the first wear-out model. In one embodiment, examining the physical condition of the selected electrical component includes nondestructively testing the selected electronic component. The examined physical condition of the electronic component can then be related to one of: (i) a remaining lifetime of the electronic component; (ii) a reliability level of the electronic component; and (iii) a point on a wear-out model of the electronic component. In one embodiment, the selected electronic component is a printed circuit board assembly.

In another aspect, the present disclosure provides an apparatus for creating a wear-out model for a selected electronic component used in a downhole environment, including a processor configured to: create a first wear-out model related to the selected electronic component, obtain data related to a physical condition of the selected electronic component at a selected examination time, and create a second wear-out model for the selected electronic component from the first wear-out model and the obtained physical condition data of the selected electronic component. The apparatus can include one or more sensors configured to monitor a stress at the selected electronic component in the downhole environment, wherein the processor is further configured to compare the monitored stress to the first wear-out model to select the examination time. In an exemplary embodiment, the processor is further configured to create the first wear-out model from data obtained from another electronic component similar to the selected electronic component. The data can be obtained for the first wear-out model by applying a simulated downhole stress to the other electronic component. In another embodiment, the processor is further configured to determine a failure rate of a plurality of sensors at the other device to create the first wear-out model. The data can be related to the physical condition of the selected electronic component further comprises nondestructive test data obtained from the selected electronic component. The processor can be further configured to relate the examined physical condition of the electronic component to one of: (i) a remaining lifetime of the electronic component; (ii) a reliability level of the electronic component; and (iii) a point on a wear-out model of the electronic component. In various embodiments, the selected electronic component is a printed circuit board assembly.

In yet another aspect, the present disclosure provides a computer-readable medium include instruction therein and accessible to a processor, wherein the processor reads the instructions to perform a method for creating a wear-out model for a selected electronic component used in a downhole environment, including: creating a first wear-out model related to the selected electronic component, obtaining data related to a physical condition of the selected electronic component at a selected examination time, and creating a second wear-out model for the selected electronic component from the first wear-out model and the obtained physical condition data of the selected electronic component. The instructions can further include: (i) monitoring a stress at the selected electronic component in the downhole environment, and (ii) comparing the monitored stress to the first wear-out model to select the examination time. In one embodiment, the instructions further includes creating the first wear-out model from another electrical component similar to the selected electrical component. The instructions may further include simulating a downhole stress at the other electrical component and determining a failure rate of a plurality of sensors at the other electronic component to create the first wear-out model.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of creating a wear-out model for an electronic component of a downhole tool, comprising:
   measuring stress levels at a plurality of failure times of prognostic sensors associated with the electronic component during operation of the electronic component in a controlled environment;
   using the measured stress levels and failure times of the prognostic sensors to create a first wear-out model that provides reliability of the electronic component at the plurality of times in the controlled environment;
   operating the electronic component in a downhole environment;
   measuring a downhole stress on the electronic component during operation of the electronic component in the downhole environment;
   comparing the downhole stress to the first wear-out model to select an examination time;
   obtaining an image of a physical condition of the electronic component at the selected examination time corresponding to a selected reliability level from the first wear-out model; and
   creating a second wear-out model for the selected electronic component that relates the image of the physical condition to the selected reliability level of the electronic component from the first wear-out model.

2. The method of claim 1, further comprising creating the first wear-out model from another electrical component that is a same model as the electrical component.

3. The method of claim 2, further comprising simulating a downhole stress at the another electrical component.

4. The method of claim 3, further comprising determining a failure rate of a plurality of sensors at the another electronic component to create the first wear-out model.

5. The method of claim 1, wherein obtaining the image of the physical condition of the electrical component further comprises nondestructively testing the electronic component.

6. The method of claim 1, further comprising relating the image of the physical condition of the electronic component to one of: (i) a remaining lifetime of the electronic component; (ii) a reliability level of the electronic component; and (iii) a point on a wear-out model of the electronic component.

7. The method of claim 1, wherein the electronic component is a printed circuit board assembly.

8. An apparatus for creating a wear-out model for a selected electronic component of a downhole tool, comprising:
a processor configured to:
measure stress levels at a plurality of failure times of prognostic sensors associated with the selected electronic component during operation of the electronic component in a controlled environment;
using the measured stress levels and failure times of prognostic sensors to create a first wear-out model providing reliability of the selected electronic component at the plurality of times in the controlled environment,
operate the electronic component in a downhole environment;
measure a downhole stress on the electronic component during operation of the electronic component in the downhole environment;
compare the the downhole stress to the first wear-out model to select an examination time;
obtain an image of a physical condition of the selected electronic component at the selected examination time corresponding to a selected reliability level from the first wear-out model, and
create a second wear-out model for the selected electronic component that relates the image of the physical condition to the selected reliability level from the first wear-out model.

9. The apparatus of claim 8, further comprising one or more sensors configured to monitor a stress at the selected electronic component in the downhole environment.

10. The apparatus of claim 8, wherein the processor is further configured to create the first wear-out model from data obtained from another electronic component that is a same model as the selected electronic component.

11. The apparatus of claim 10, wherein data is obtained for creating the first wear-out model by applying a simulated downhole stress to the another electronic component.

12. The apparatus of claim 11, wherein the processor is further configured to determine a failure rate of a plurality of sensors at the another electronic component to create the first wear-out model.

13. The apparatus of claim 8, wherein the image of the physical condition of the selected electronic component further comprises nondestructive test data obtained from the selected electronic component.

14. The apparatus of claim 8, wherein the processor is further configured to relate the image of the physical condition of the electronic component to one of: (i) a remaining lifetime of the electronic component; (ii) a reliability level of the electronic component; and (iii) a point on a wear-out model of the electronic component.

15. The apparatus of claim 8, wherein the selected electronic component is a printed circuit board assembly.

16. A non-transitory computer-readable medium include instruction therein and accessible to a processor, wherein the processor reads the instructions to perform a method for creating a wear-out model for a selected electronic component of a downhole tool, comprising:
obtaining measurements of stress levels at a plurality of failure times of prognostic sensors associated with the selected electronic component during operation of the electronic component in a controlled environment;
using the measured stress levels and failure times of prognostic sensors to create a first wear-out model that provides reliability of the selected electronic component at the plurality of times in the controlled environment,
operating the electronic component in a downhole environment;
measuring a downhole stress on the electronic component during operation of the electronic component in the downhole environment;
comparing the downhole stress to the first wear-out model to select an examination time;
obtaining an image of a physical condition of the selected electronic component at the selected examination time corresponding to a selected reliability level from the first wear-out model, and
creating a second wear-out model for the selected electronic component that relates the image of the physical condition to the selected reliability level of the electronic component from the first wear-out model.

17. The non-transitory computer-readable medium for claim 16, further comprising creating the first wear-out model using another electrical component that is a same model as the selected electrical component.

18. The non-transitory computer-readable medium of claim 17, further comprising simulating a downhole stress at the another electrical component and determining a failure rate of a plurality of sensors at the other electronic component to create the first wear-out model.

* * * * *